C. L. SCHWARZ.
VEHICLE WHEEL.
APPLICATION FILED OCT. 5, 1912.
1,072,515.
Patented Sept. 9, 1913.
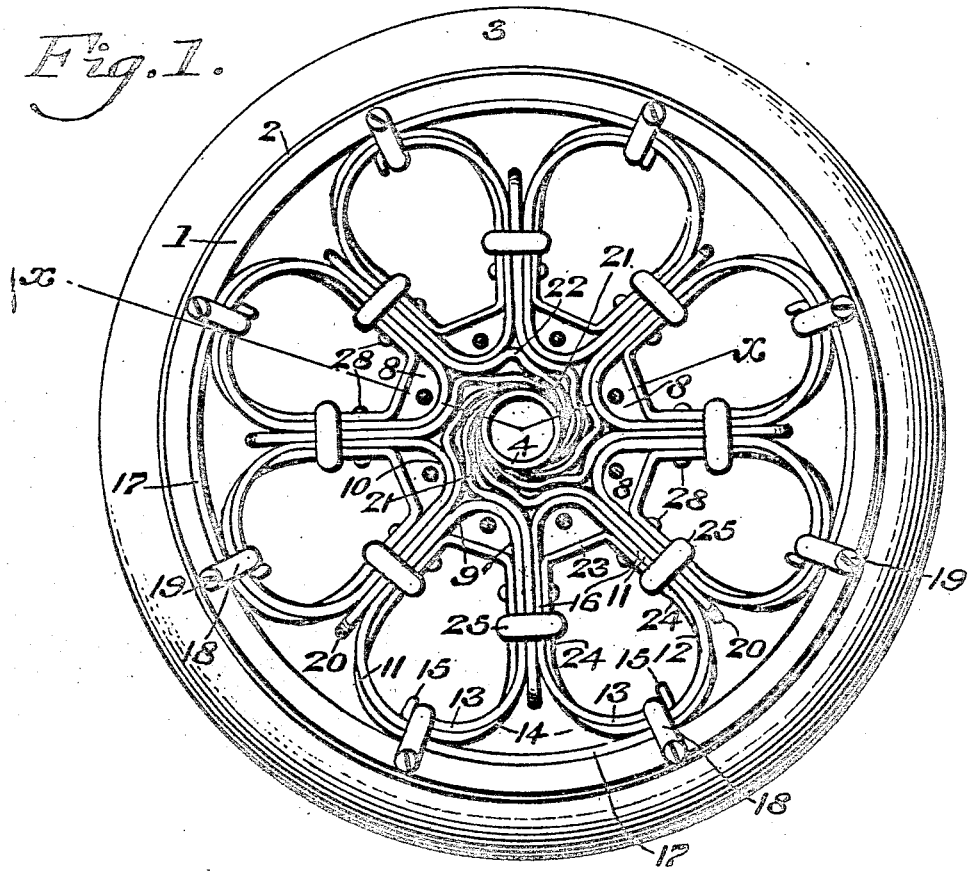
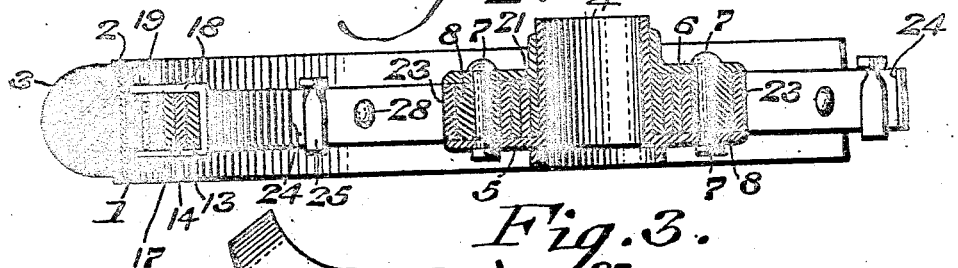
WITNESSES
INVENTOR
Charles L. Schwarz
BY Wiederohein & Fairbanks
ATTORNEYS

UNITED STATES PATENT OFFICE.

CHARLES L. SCHWARZ, OF PHILADELPHIA, PENNSYLVANIA.

VEHICLE-WHEEL.

1,072,515.

Specification of Letters Patent.

Patented Sept. 9, 1913.

Application filed October 5, 1912. Serial No. 724,070.

*To all whom it may concern:*

Be it known that I, CHARLES L. SCHWARZ, a citizen of the United States, residing in the city and county of Philadelphia, State of Pennsylvania, have invented a new and useful Vehicle-Wheel, of which the following is a specification.

This invention relates to vehicle wheels and more particularly to the spring type of wheel whereby the use of pneumatic tires, cushion tires or the like in connection therewith is dispensed with, and, in consequence, the trouble incident to punctures, blowouts and other tire difficulties is eliminated.

It has for an object to provide a wheel in which the spokes are formed of a novel construction of spring material and so connected with the rim and hub as to distribute the compressive force and produce a resilient action, effective for the desired purpose.

Figure 1 represents a side elevation of a wheel embodying my invention, showing a portion of the hub removed. Fig. 2 represents a sectional view on line $x-x$, Fig. 1 on an enlarged scale. Fig. 3 represents a perspective view of one of the members of the spoke construction in detached position.

The annexed drawing and the following description set forth in detail one mechanical form embodying the invention, such detail construction being but one of various mechanical forms in which the principle of the invention may be used.

In said annexed drawings, 1 designates the rim of a wheel, the same being preferably of wood and having secured thereto a metal band 2 adapted to receive and hold the tire 3, which latter may be of any suitable or desired construction.

4 designates a hub provided with a flange 5, which forms one side of a spoke seat of which the other side is formed by an annular plate 6 secured by suitable bolts 7 or other fastening devices. The flange 5 and plates 6 are spaced apart to receive blocks 8, preferably of wood, each of which is provided with a suitable opening for the fastening bolts 7. The blocks 8 are of suitable form having outwardly curved face portions 9 and a curved apex 10 for coöperation with the spoke structure, it being understood that the blocks 8 are suitably positioned at intervals around the hub 5 and serve as bearings for the spoke structure. The spoke structure consists, in the present instance, of pairs of spring members 11 and 12, preferably of spring material and preferably of substantially similar construction. Each spoke member comprises a band of metal, the ends of which are oppositely curved as at 13 and 14, the ends of a pair being reversely situated, and the inner end 13 being bent to provide the shoulder 15, which serves as a stop, as will be hereinafter described. Each of the spoke members is provided with straight side portions 16 and pass around the curved apex 10 of a block 8, whereby it will be seen that the two sides diverge from the hub 5 to a suitable point adjacent the rim.

17 designate auxiliary springs having suitably curved ends in order that each spring 17 will suitably embrace a pair of spoke members at all times, while permitting sliding movement therebetween, and which spring 17 is situated along the rim and serves as an additional resilient member, as will be evident.

18 designate clips preferably U-shaped, having a bolt 19 or other suitable fastening means, for connecting the same with the rim 1, said clips embracing the curved ends 13 and 14 of a spoke member, and also a suitable portion of the spring 17 in order to hold the parts in suitable position, but permitting movement of the said ends 13 and 14 with respect to the rim 1. As will be seen, the shoulder 15 will abut the clip 18 and prevent improper movement of the curved ends. It will of course be understood that a plurality of these clips are necessary and are spaced at suitable intervals about the rim with respect to each spoke member.

20 designates a spring arm or member preferably having a curved end 21 adapted to conform to the curvature of the hub 5 around which it extends a sufficient distance to grip the same to position the arm correctly with relation to the spoke members. An arm 20 is located between each spoke member 22 designates a bend or bead formed between the arm 20 and the curved end 21 thereof, which curve or bend provides for a bearing for the inner end of a spoke member and also for the next adjacent spring arm 20, as will be evident from Fig. 1.

23 designates a supplemental spring having side arms 24 extending outwardly from the block 8 along the inner wall of the side 19 of each spoke member, said supplemental spring serving as an additional brace or strengthening means, without impairing the resiliency of the spoke member.

In order to suitably connect the adjacent spoke members and the spring arm 20 therebetween as well as the supplemental spring 23, I provide clips 25 which embrace the parts properly in order to hold the same in position. I may, if desired, provide the spring arms with recesses 26 formed by lugs 27 thereon, in which recesses the clips 25 are seated. I may further, if desired, provide bolts or other suitable fastening means 28, as an additional means for connecting the spoke members, the arm 20 and the supplemental spring 23. It will thus be apparent that each arm 20 connects a pair of spoke members with the hub and a supplemental spring structure is formed with the hub.

The advantages of this novel wheel construction will be apparent when it is realized that the ends of each spoke member are secured to the rim in such a manner that a movement is permitted relative to these parts, while the connection between the rim and spoke members is such as to overcome any tendency for a lateral movement. The supplemental springs 17 serve as a stiffening member without impairing the resiliency as do also the supplemental springs 23, which are suitably connected with the spoke members. By forming the arm 20 as described, each spoke structure will be resiliently supported by its own arm 20 and also by the next adjacent arm 20. The entire structure and its adjuncts are so co-related and connected as to form a sufficiently stiff and rigid wheel, incapable of lateral flexing, at the center of the wheel, though yielding and resilient to radial pressures and lateral flexing at the rim.

Having thus described my invention, what I claim as new and desire to secure by Letters Patent, is:—

1. In a spring wheel, a hub, a plurality of spoke members suitably connected therewith, and formed with their free ends overlapping and correspondingly curved and having sliding movement with respect to each other, a spring arm secured to adjacent spoke members and bearing on said hub, a rim, means for attaching said spoke members with respect to said rim to permit sliding movement between said rim and said spoke members, and a stop on each of said spoke members abutting said attaching means.

2. In a spring wheel, a hub, a plurality of spoke members suitably connected therewith, a spring arm secured to adjacent spoke members and bearing on said hub, a rim, means for attaching said spoke members with respect to said rim, supplemental springs, one of which is connected with each spoke member and means each serving to connect a spring arm with its adjacent spoke members, and also serving to connect one member of a supplemental spring with its respective spoke member.

3. In a spring wheel, a hub, a rim, a plurality of spoke members movably connected with respect to said rim, each spoke member comprising a spring band having sides oppositely diverging from the hub, said sides terminating in oppositely located curved members overlapping each other and each movable with respect to each other; spring means between said spoke members and said hub, and an auxiliary spring interposed between said rim and pairs of spoke members and closely embracing the latter at all times while permitting sliding movement therebetween.

4. In a spring wheel, a hub, a plurality of spoke members connected therewith, a spring arm secured to adjacent spoke members and bearing on said hub, a rim, means for attaching said spoke members with respect to said rim and auxiliary springs closely embracing at all times pairs of adjacent spoke members and permitting relative sliding movement therebetween.

5. In a spring wheel, a hub, a plurality of spoke members connected therewith, a spring arm having a curved end adapted to conform to the curvature of the hub and having a bend intermediate the arm and curved end thereof, said arm being secured to adjacent spoke members, a rim, means for attaching said spoke members with respect to said rim to permit relative movement between said rim and said spoke members, and an auxiliary spring between each pair of spoke members and said rim.

6. In a spring wheel, a hub, a plurality of spoke members connected therewith, a spring arm having a curved end adapted to conform to the curvature of the hub and having a bend intermediate the arm and curved end thereof, said arm being secured to adjacent spoke members, a rim, means for attaching said spoke members with respect to said rim to permit relative movement between said rim and said spoke members, an auxiliary spring between each pair of spoke members and said rim, and a supplemental spring for each spoke member suitably connected therewith.

CHARLES L. SCHWARZ.

Witnesses:
C. D. McVay,
M. E. Byrne.